"106. COMPOSITIONS, COATING OR PLASTIC"

"81"

"Cross Reference"

"Examiner"

UNITED STATES PATENT OFFICE.

607,528

ROBERT FERGUSSON STRONG, OF LONDON, ENGLAND.

TREATMENT OF PEAT OR OTHER LIGNEOUS SUBSTANCES.

SPECIFICATION forming part of Letters Patent No. 607,528, dated July 19, 1898.

Application filed June 1, 1897. Serial No. 638,921. (No specimens.) Patented in England June 20, 1896, No. 13,649.

*To all whom it may concern:*

Be it known that I, ROBERT FERGUSSON STRONG, a subject of the Queen of Great Britain, and a resident of Victoria street, Westminster, London, England, have invented certain new and useful Improvements in the Treatment of Peat or other Ligneous Substances, (for which I have obtained a patent in Great Britain, No. 13,649, dated June 20, 1896,) of which the following is a full, clear, and exact specification thereof.

My invention relates to a new or improved process for the treatment of peat and other ligneous substances for producing paving-blocks, slabs, tiles, slates, conduits, and fuel wherein the ingredients used are peat, caustic alkaline earth, and pyroligneous acid combined in suitable proportions, according to the product required.

One of the objects of my invention is the production of waterproof fuel for household, industrial, and other purposes.

In carrying my invention into practice I use dry peat, sawdust, or other ligneous substances, which are first ground or disintegrated, when I add thereto twenty to thirty per cent. or thereabout of caustic alkaline earth—such as lime, dolomite, and the like—the whole being thoroughly mixed together. To this mixture I further add ten per cent. or thereabout of pyroligneous acid, ($CH_3CO_2H$,) which is thoroughly incorporated therewith. This acid has a great affinity for caustic alkaline earths and absorbs the same readily, while solidifying the whole mass, which is subsequently pressed into blocks or briquets by suitable presses. On issuing from the press the blocks or briquets are cooled by a fan or blower and are then ready for use. The blocks thus manufactured have all the qualities of the best asphalt, are waterproof, and have the resiliency of wood-paving, while being as noiseless as the latter. Moreover, it has, as compared with wood-paving and asphalt, further important advantages by providing a better foothold for horses and exhibiting the antiseptic qualities of peat.

I may instead of blocks form slabs, flagstones, tiles, slates, and the like of the same material, or I may use it in a plastic state to form the upper surface of roads, streets, and the like, in which case I reduce the blocks prepared in the manner above described into powder and apply it as found desirable.

In the manufacture of briquets as fuel for household and industrial purposes I add to the ground and dried peat or other ligneous substance only from one to two per cent. of caustic alkaline earth and about five per cent. of pyroligneous acid.

In some cases the fuel is made in the form of peat-coke by adding to the mass before compression three to five per cent. of silicate of soda in aqueous solution. The mass is then pressed in the usual manner and is subsequently coked.

I may obviously vary the above proportions to a slight extent without departing from the nature of this invention.

Having now particularly described and ascertained the nature of my said invention and in what manner the same is to be performed, I declare that what I claim is—

1. The herein-described process for the treatment of peat and other ligneous substances for the purpose set forth, which consists in adding to, and thoroughly mixing with, such ligneous substance, when in a disintegrated condition, a caustic alkaline earth, and then adding to, and thoroughly mixing with such composition, pyroligneous acid, substantially as described.

2. The herein-described process for the treatment of peat and other ligneous substances for the purpose set forth, which consists in adding to, and thoroughly mixing with, such ligneous substance, when in a disintegrated condition, a caustic alkaline earth, then adding to, and thoroughly mixing with such composition, pyroligneous acid, and finally adding silicate of soda, substantially as described.

In testimony that I claim the foregoing I have hereunto set my hand this 14th day of May, 1897.

ROBERT FERGUSSON STRONG.

Witnesses:
 FRED C. HARRIS,
 G. F. WARREN.